United States Patent [19]

Fusco

[11] 4,033,599
[45] July 5, 1977

[54] FOLDABLE MUDFLAP ASSEMBLY

[76] Inventor: Anthony F. Fusco, 2248 Charlotte Ave., Concord, Calif. 94518

[22] Filed: Feb. 17, 1976

[21] Appl. No.: 658,514

[52] U.S. Cl. .................................. 280/154.5 R
[51] Int. Cl.² ................................... B62D 25/16
[58] Field of Search ............ 280/154.5 R, 154.5 A; 298/1 SG; 135/25, 15 PQ

[56] References Cited

UNITED STATES PATENTS

| 480,482 | 8/1892 | Ward | 135/25 R |
|---|---|---|---|
| 487,544 | 12/1892 | Simon | 135/15 PQ X |
| 528,212 | 10/1894 | Smith, Jr. | 135/25 R |
| 1,117,382 | 11/1914 | Hirtz | 135/25 R |
| 2,872,211 | 2/1959 | Barrett | 280/154.5 R |
| 2,935,336 | 5/1960 | Case | 280/154.5 R |

Primary Examiner—Philip Goodman
Assistant Examiner—Michael J. Forman

Attorney, Agent, or Firm—Bruce & McCoy

[57] ABSTRACT

A foldable mudflap assembly for retractably disposing mudflaps behind the wheels of a truck or the like comprised of an elongated support member adapted to be attached to the truck between and proximate the truck's wheels, an elongated extension member pivotally connected to each end of the support member such that mudflaps attached to the extension members can be pivotally extended into an operative position behind the truck's wheels or to a retracted position between said wheels. The mudflaps are releasably locked into their extended operative position by providing guide plugs link connected to the extension members and slidable within the support member; a releasable stop member is in turn disposed to engage the guide plug within the support member to prevent axial movement thereof. Simple mating hooks are provided to lock the mud flaps in their fully retracted position.

4 Claims, 5 Drawing Figures

U.S. Patent July 5, 1977 4,033,599
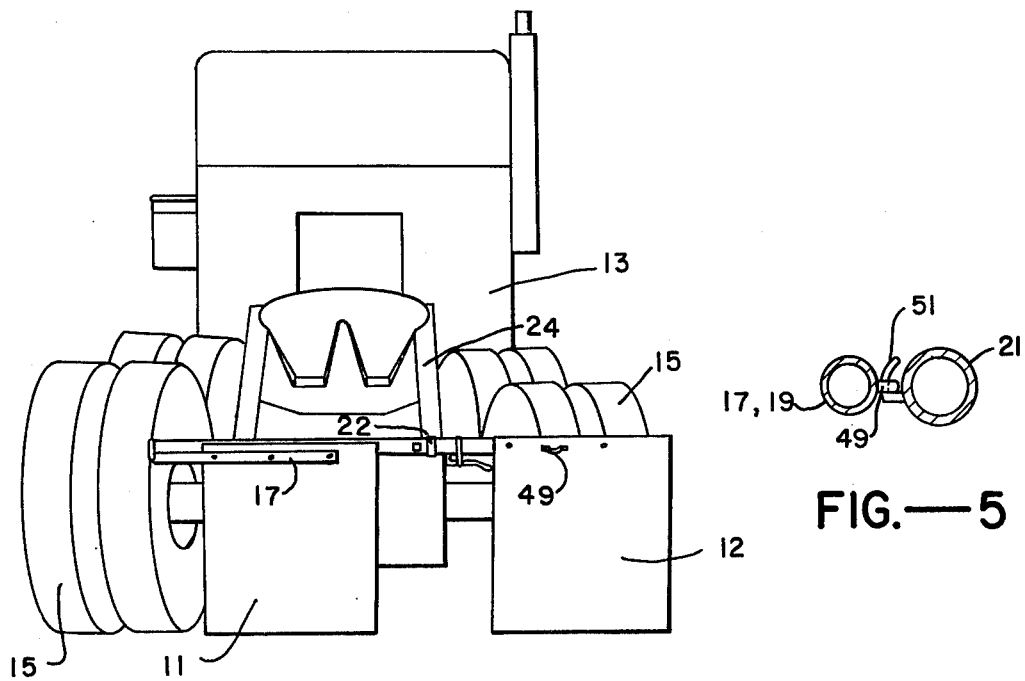
FIG.—1
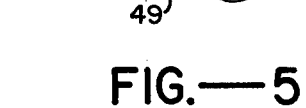
FIG.—5
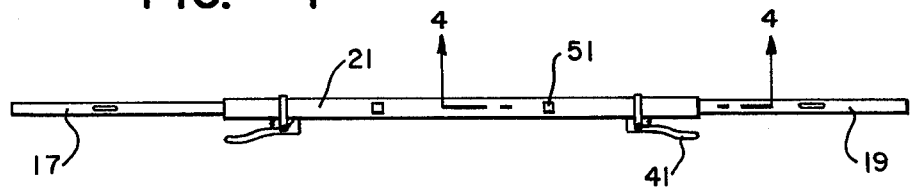
FIG.—2
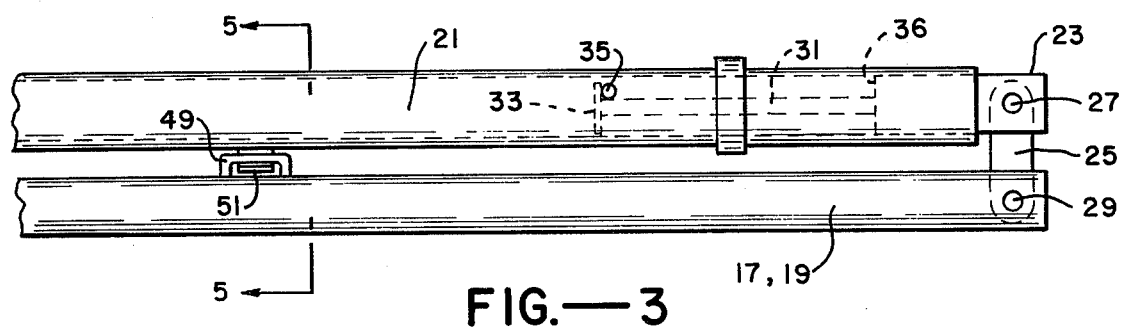
FIG.—3
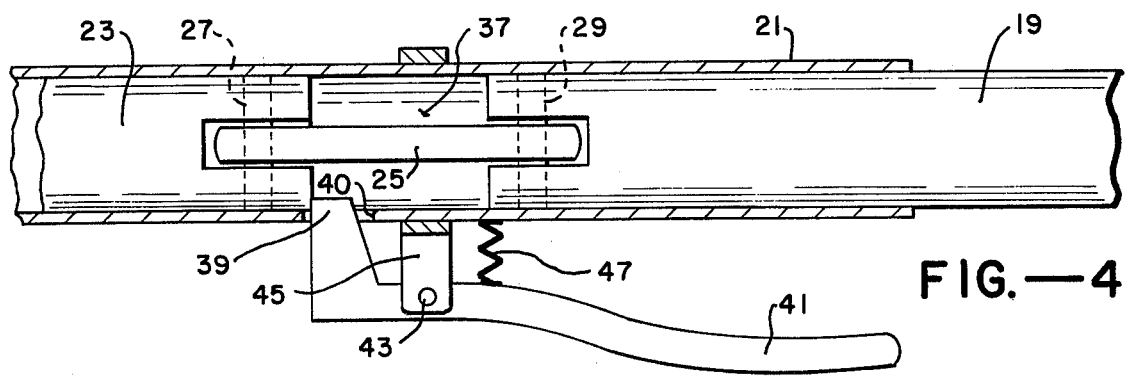
FIG.—4

FOLDABLE MUDFLAP ASSEMBLY

BACKGROUND OF THE INVENTION

1. Field of Invention

The present invention relates to mudflaps for trucks and more particularly to a foldable mudflap assembly for retractably disposing the mudflaps to an operative position behind the truck's wheels.

2. Description of the Prior Art

It is well known to dispose mudflaps behind the wheels of a truck or truck tractor in order to catch mud, road surface materials or other debris which are picked up and propelled backwards by the truck's wheels. While the mudflaps usually hang freely without perceptable wear or damage, except perhaps from abrading road materials, there are circumstances where serious damage to the mud-flaps does occur due to the particular operating conditions of the vehicle. One example is where the mudflaps behind the wheels of the tractor portion of a tractor trailer rig, required when the motorized tractor is operated without a trailer in tow, interfere with the trailer auxiliary support legs of a flatbed or van trailer or the frame or gooseneck of a low bed trailer. This interference which is damaging to the mudflaps occurs from the jack-knifing effect of the tractor and trailer when the vehicle is in a turn.

Another example is dump truck mudflaps which get caught beneath the wheels when the dump truck is backed over rough terrain. Experience has shown that in this case the flaps are often destroyed.

Heretofore, it has only been known to fasten mudflaps to the undercarriage or fixed frame portion of a truck in order to position the mudflaps in a fixed operative position behind the truck's wheels. To prevent damage the mudflaps in jeopardy of being damaged would have to be completely removed during the adverse operating conditions, a time consuming operation which in some cases presents a storage problem with respect to the unused flaps.

The present invention overcomes the problem of interfering mudflaps by providing an apparatus for quickly and easily retracting the mudflaps from an operative position behind the truck's wheels to a non-interferring position between the wheels. For example, when a dump truck having mudflaps is backed over rough terrain the operator using the present invention can simply retract the mudflaps so that they do not get caught under the truck's wheels and then after discharging his load quickly return the flaps to their operative position.

SUMMARY OF INVENTION

The present invention is a foldable mudflap assembly which retractably holds mudflaps behind the wheels of a truck or the like. The assembly is comprised of an elongated support member attached to the truck between and proximate the truck's wheels and two elongated extension members pivotally connected to the ends of the support member. The elongated extension members are adapted to attach along the upper portion of the mudflaps such that the mudflaps can hang substantially vertically therefrom whereby the extension members with their attached mudflaps can be pivotally extended into substantial alignment with the elongated support member for placing mudflaps in operative position behind the wheels of the truck, or folded back onto the support member for retracting the mudflaps to a position between the wheels. Means for releasably locking the extension members into their extended operative position are provided, as well as means for releasably locking the extension members into their folded back or retracted position.

OBJECTS OF THE INVENTION

It is therefore an object of the present invention to provide a foldable mudflap assembly for retractably holding mudflaps behind the wheels of a truck or the like.

It is another object of the present invention to provide a foldable mudflap assembly wherein mudflaps operatively disposed behind the wheels of a truck can be folded back or retracted to a position between the truck's wheels.

It is a further object of the present invention to provide a foldable mudflap assembly wherein the mudflaps can quickly and easily be retracted from behind the truck's wheels under operating conditions which might cause those particular mudflaps to be damaged or even destroyed.

It is still another object of the present invention to provide a foldable mudflap assembly which can be easily mounted to the frame of a truck between and proximate the truck's wheels.

It is still a further object of the present invention to provide a foldable mudflap assembly having a sturdy and yet simple and economical construction.

And it is yet another object of the present invention to provide a foldable mudflap assembly wherein the mudflaps can be releasably locked into either their extended operative position or their retracted position.

Other objects of the present invention will become apparent from the following specification and claims.

DESCRIPTION OF THE DRAWINGS

FIG. 1 is a pictorial view of the tractor portion of a tractor trailer truck showing the foldable mudflap assembly of the present invention attached thereto.

FIG. 2 is a front elevational view of the foldable mudflap assembly of the present invention with the mudflap carrying elements, or extension members, shown in their extended position.

FIG. 3 is a partial top view of the mudflap assembly showing an extension member in a fully retracted position.

FIG. 4 is a partial cross-sectional view taken along lines 4—4 of FIG. 2.

FIG. 5 is a cross-sectional view taken along lines 5—5 of FIG. 3.

DESCRIPTION OF THE PREFERRED EMBODIMENT

Turning now to the drawings, the foldable mudflap assembly of the present invention is shown in its preferred form with FIG. 1 illustrating mudflap 12 in an extended operative position and mudflap 11 in a retracted position. As can be seen, in the operative position a mudflap secured to the foldable mudflap assembly of the present invention is disposed directly behind wheels 15 of truck tractor 13 whereas when retracted the mudflap is disposed between the wheels where it will not interfere with the corner of a truck trailer unit should a trailer be attached to the tractor. It is understood that the present invention can also be mounted in back of a single unit truck, such as a dump truck, as well as the tractor of a trailer rig as shown.

Referring to FIG. 2, the present invention has two elongated extension members 17 and 19 pivotally connected to the ends of elongated support member 21. The elongated support member is attached to the truck between and proximate to the truck's wheels as shown in FIG. 1 by a suitable number of brackets, such as bracket 22, fastened to the truck's frame 24. The two extension members 17 and 19 attached to the upper portion of the mudflaps such that the mudflaps hang substantially vertically from the extension members; the pivotal connection of extension members 17 and 19 to support member 21 thus allows the mudflaps to be pivotally moved about the ends of the support member. Specifically, the extension members are capable of being pivotally moved or extended into substantial axial alignment with the elongated support member for disposing the mudflaps directly behind wheels 15 of the truck as shown with respect to mudflap 12 in FIG. 1, or pivotally moved or folded back onto the support member to a fully retracted position between the truck's wheels as is shown with respect to mudflap 11.

Means for releasably locking the extension members into their fully retracted or folded back position is provided and, as most clearly seen in FIG. 5, preferably consists of an open ended hook 51 secured proximate each end of support member 21 adjacent the fully retracted extension member; a corresponding eye hook 49 is secured to each extension member in a position to lockingly engage hook 51 when the extension member is folded back against the support member. To bring the hooks 49 and 51 into locking engagement, the extension member only need be lifted slightly in an upward direction such that eye hook 49 slips over the end of open hook 51. The weight of the mudflaps hanging from the extension member will then easily hold the locking engagement by holding the eye hook down on the open hook.

The present invention also provides a means for releasably locking the extension members into a fully extended operative position. Referring to FIGS. 3 and 4, each extension member 17, 19 has a guide plug 23 pivotally connected to the extension member by link member 25. It is noted that support member 21 is hollow and preferably a section of metal tubing or pipe, and both the guide plug and its pivotally connected extension member are formed to slide within the support member when these members are brought into axial alignment with one another by pivotal movememt about link member 25. The link member actually creates two pivot points in that one end of the link member is pivotally connected to the guide plug by pin 27 and the opposite end of the link member is pivotally connected to the end of the extension member by pin 29; when the link connected end of the guide plug projects beyond the end of the hollow support member the double pivot of the link member allows the extension member to be readily pivoted from an extended position to a fully retracted position against the support member whereupon it can be locked in this position in the manner described above. On the other hand, by aligning the extension member with the guide plug and sliding the guide plug and extension member assembly into the hollow support member, the extension member can be rigidly held in its extended position to fixably place the mudflap hanging from the extension member in an operative position.

Means for releasably locking the extension member 17, 19 against sliding within support member 21 is provided in the following preferred arrangement: Link member 25 is of a length to space apart the ends of the guide plug 23 and the extension member 17, 19 so as to form a gap 37 therebetween when the guide plug and extension member are in aligned relation. A spring loaded stop member 39 is mounted proximate each end of the support member with each stop member being disposed over an opening 40 formed in the side of the support member. When gap 37 between the extension member and guide plug aligns with opening 40 stop member 39 is urged by the spring loading into the gap, thereby preventing further sliding movement of the extension member within the support member. Hence, when stop member 30 has engaged with gap 37 the mudflaps hanging from the extension members are fully locked into an operative position behind the wheels of the truck. The only way to release the mudflaps from this operative position is then to retract stop member 39 from gap 37 and slide the extension member from support member 21.

As shown in FIG. 4, the means for releasing the stop member from gap 37 includes a handle 41 integrally formed to stop member 39 and pivotally mounted to support member 21 by pin 43 and bracket 45. The handle is urged in a clockwise direction by spring 47 which as can be seen urges stop member 39 through opening 40 and into gap 37 if and when the extension member and guide plug are suitably positioned within the support member. Release handle 41 is formed to be conveniently gripped to pivot the handle toward the support member against the spring loading of spring 47. By gripping handle 41 in this manner stop member 39 is retracted from the gap and the assembly formed by the guide plug, extension member, and interconnecting link member is thereupon free to slide within the support member. Thus, by simply gripping the release handle the extension member can be withdrawn from the support member to a position where it can be pivoted about the link member and folded back to a retracted position.

To prevent the guide plug extension member assembly from being inadvertently pulled entirely out of the support member, a transverse disc 33 of a size to fit within the support member is secured in spaced relation to guide plug 23 by elongated rod 31. Post 35 is disposed within the support member in a position which will not interfere with connecting rod 31, but which will engage plate 33 as the guide plug is pulled from the support member. Interconnecting rod 31 should be of a suitable length and post 35 suitably positioned to allow adequate movement of the guide plug and extension member within the support member, that is, to allow gap 37 to align with opening 40 at one extreme and to allow full pivotal movement about link member 25 at the other extreme. Optimumly, when the guide plug and extension member assembly is inserted in the support member to the locked position shown in FIG. 4, the lead surface 36 of guide plug 23 should engage plug 35 to prevent small sliding movements which could otherwise occur to the extent allowed by the relative widths of the gap and stop member. This would in turn prevent the acceleration forces caused by the play in the gap from breaking off the stop member 39 or otherwise damaging the apparatus.

The present invention provides a foldable mudflap assembly which can be quickly and easily installed on a truck or other vehicle to provide the capability of retracting the mudflaps to a non-operative position under conditions where the mudflaps would otherwise have to be removed altogether. The present invention has the particular advantage of being easy to operate and having an overall simple and economical construction.

Although the present invention has been described in considerable detail in the foregoing specification, it is not intended that it be limited to such detail, except as may necessitated by the appended claims.

What I claim is:

1. A foldable mudflap support assembly for retractably disposing mudflaps behind the wheels of a mudflap carrying vehicle comprising an elongated hollow support member adapted to be attached to said vehicle between and proximate the rear portion of said wheels, two elongated extension members each having a support end which is shaped and of a size to slide within the ends of said hollow support member, and each having means to attach a mudflap thereto such that said mudflap will hang substantially vertically therefrom, a guide plug slidably disposed in each end of said support member, a link member interconnecting the support end of each extension member to one of said guide plugs so as to provide a doubly pivotal interconnection therebetween whereby each of said extension members can be secured in an extended operative position by aligning the support end thereof with the guide plug and sliding the support end into the end of said hollow support member until said interconnecting link member is captured thereby, or whereby each of the extension members can be folded back to a fully retracted position against said support member by sliding the extension member and guide plug outwardly until the pivotally interconnecting link member is positioned just outside of its capturing hollow support member, means for releasably locking said extension members into said extended operative position, and means for releasably locking said extension members into said retracted position.

2. The foldable mudflap support assembly of claim 1 wherein said link member is of a length to space apart the ends of said guide plugs and extension members to form a gap therebetween when in aligned relation and wherein a spring loaded stop member is mounted proximate each end of said support member, said spring loaded stop members being disposed in openings formed in the side of said support member whereby when the gap between said extension members and guide plugs align with said openings said stop members are urged by said spring loading into said gap thereby preventing sliding movement of said extension members, and said stop members having means for releasing same from said gaps.

3. The foldable mudflap support assembly of claim 2 wherein said stop member releasing means includes a handle pivotally mounted to said support member, said handle being formed to be gripped to pivot said handle toward the support member and having said stop member secured opposite the pivot point such that the stop member is retracted from said gap when the handle is gripped.

4. The foldable mudflap support assembly of claim 1 including means for preventing the assemblies formed by said extension members and guide plugs from being pulled entirely out of said support member, said pull prevention means including for each assembly a post disposed within and proximate the end of said hollow support member, a plate transversely disposed in said support member behind said post, and a rod interconnecting said plate to said guide plug, said interconnecting rod being of a length and disposed to allow said guide plug to outwardly slide within said hollow support member until it substantially reaches the end thereof whereupon said plate engages said post to prevent further outwardly movement of said guide plug.

* * * * *